United States Patent Office 3,415,468
Patented Dec. 10, 1968

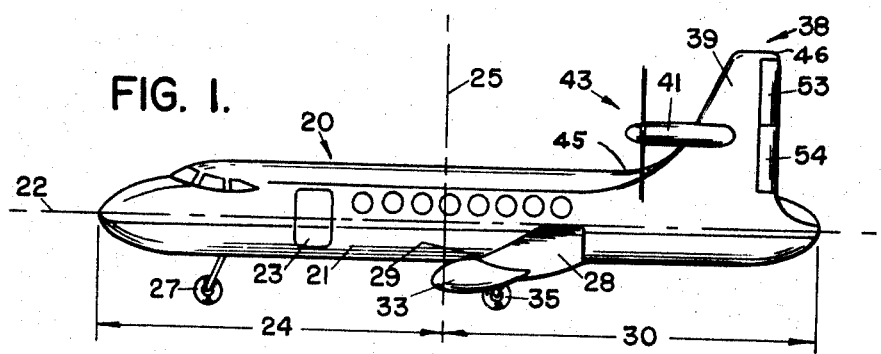
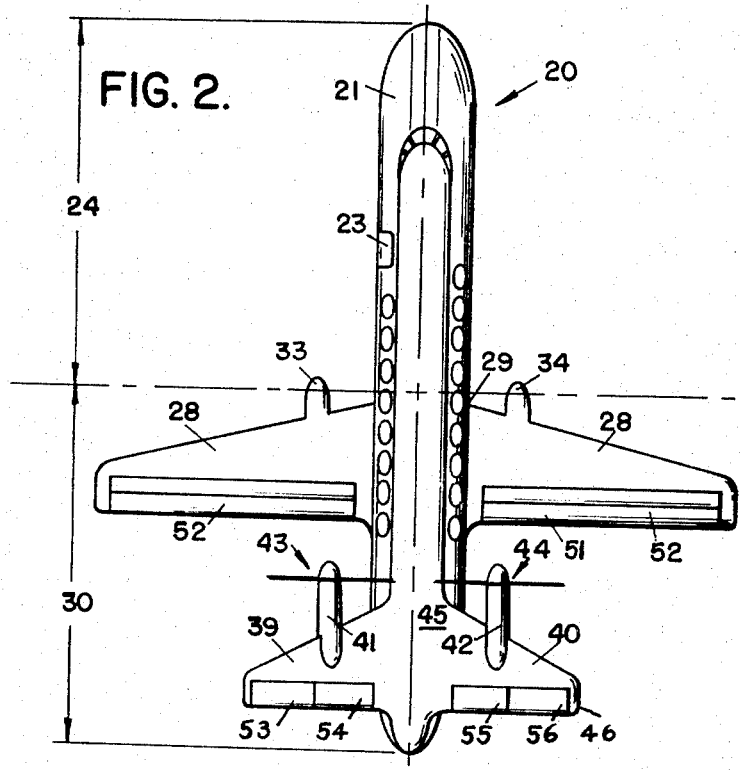
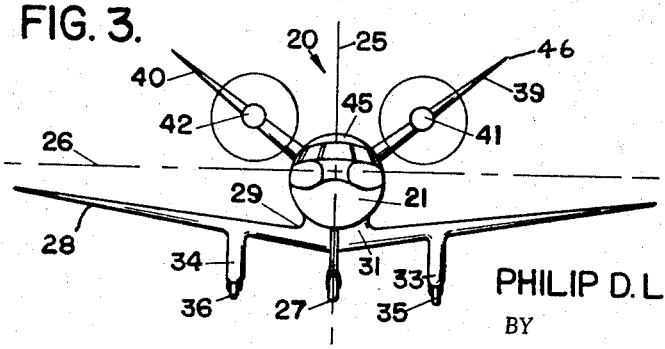

3,415,468
AIRCRAFT
Philip D. Labombarde, Indian Rock Road,
Nashua, N.H. 03060
Filed Sept. 19, 1966, Ser. No. 580,342
7 Claims. (Cl. 244—13)

ABSTRACT OF THE DISCLOSURE

An aircraft having a forward fuselage free of engines, or protuberances, and a rearward fuselage with a low level monoplane main wing devoted entirely to lift and free of attitude controls is powered and directionally controlled by a pair of V shaped combined engine pylon and tail planes, there being a thrust-producing engine immovably fixed intermediate of each tail plane and movable control surfaces on each tail plane for controlling attitude on all three axes of the aircraft.

---

Figure 4:
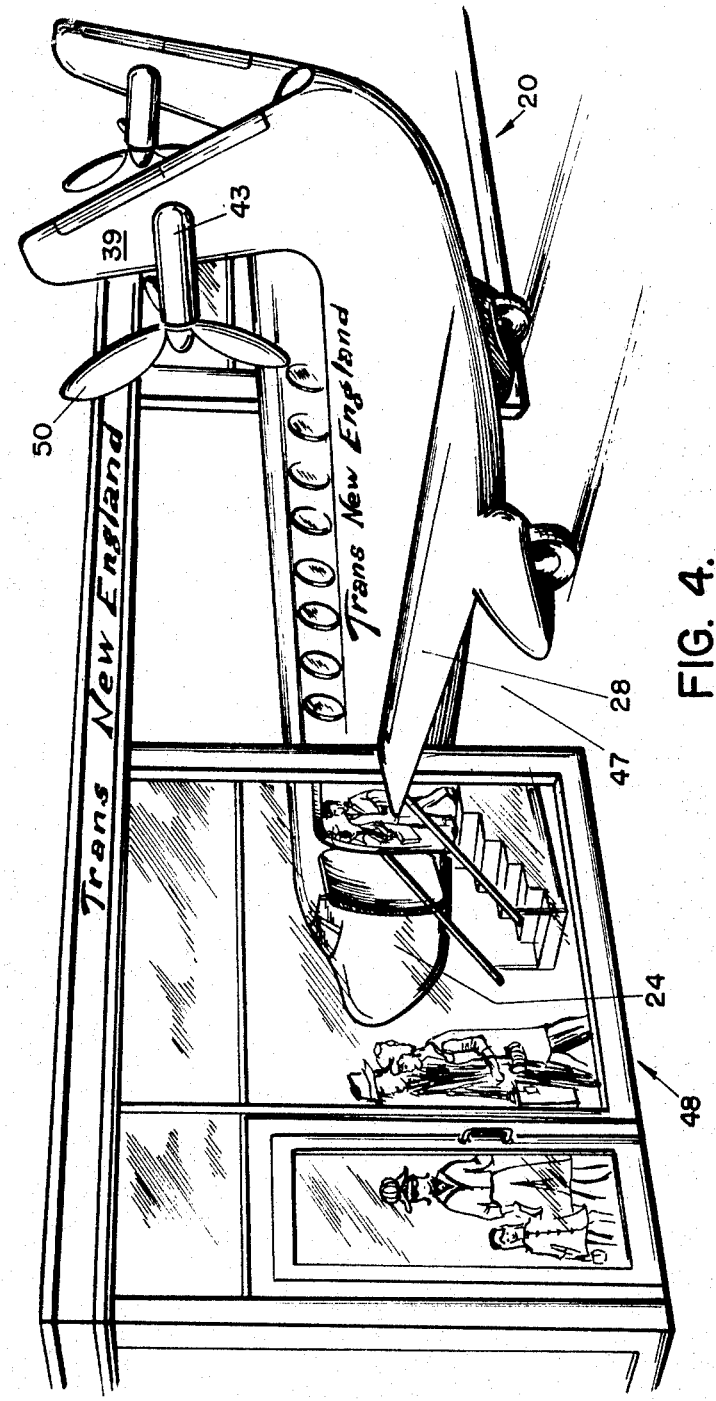

This invention relates to an improved aircraft of the subsonic speed type.

In general, the aircraft of the invention includes an elongated fuselage having a main lifting wing centrally thereof which is free of control surfaces and devoted entirely to providing lift to the plane. The tail assembly, on the other hand, includes a pair of upwardly inclined, combined, engine pylon and tail planes, carrying the engines and having two movable control surfaces in the trailing edge of each plane. Thus the tail planes support the engines aft of the fuselage and well above the level of the fuselage, the control surfaces are in the slip stream of the turbo-prop jet engines, the attitude of the aircraft is controlled on all three axes by the tail plane control surfaces, and the conventional vertical rudder structure is entirely eliminated.

The aircraft of the invention may thus have a forward entrance door, the forward portion of the fuselage may enter a terminal doorway for loading under cover while the engines, aft of the aircraft, are still in operation, and the high level, aft engines cause no passenger interference or noise discomfort.

The principal object of the invention is to provide an aircraft with a main wing devoted entirely to lift and a pair of V shaped combined engine pylon and tail wings, each immovably supporting an engine intermediate of the height thereof and each having control surfaces for controlling the attitude, or direction, of the aicrraft on all three axes.

Other objects and advantages of the invention will be apparent from the claims, the description of the drawings, and from the drawings.

In the drawings:
FIGURE 1 is a side elevation,
FIGURE 2 is a plan view, and
FIGURE 3 is a front elevation of an aircraft constructed in accordance with the invention.
FIGURE 4 is a perspective view on an enlarged scale showing an aircraft of the invention in a loading terminal.

As shown in the drawings, the improved aircraft 20 of the invention includes an elongated fuselage 21, having a horizontal longitudinal axis 22, and an entrance door 23 in the forward portion 24. The central vertical axis is designated 25, and the horizontal, lateral axis is designated 26. The fuselage 21 is preferably cylindrical in configuration, thereby being of low cost and great strength, and the forward portion 24 is free of engines or other protuberances, except the retractable forward landing wheel 27.

Aircraft 20 is preferably a monoplane, the main, monoplane lifting wing 28 being immovably fixed centrally of the length of the fuselage 21 just in rear of the forward portion 24 with the leading edge 29 of the wing about at the centre, and the remainder of the wing entirely in the rearward portion 30 of the fuselage. Preferably the generally horizontal main wing 28 is tangentially fixed under the fuselage as at 31, so that it is at a low level, the wing being simple in construction, with no built in recesses for landing gear, and its hollow interior being available for carrying a maxmum fuel supply. A pair of suitable pods 33 and 34 are fixed under the wing 28, independently thereof and exteriorly thereof, for receiving the retractable landing wheels 35 and 36.

The aircraft 20 includes the novel tail assembly 38, aft of the fuselage, the tail assembly 38 being free of any conventional, vertically upstanding rudder structure, and comprising a pair of combined engine pylon and tail planes 39 and 40, defining a V configuration. In this invention, the main wing 28 is used solely for the purpose of immovably supporting the engines and lift to hold the aircraft in the air, and the two tail planes 39 and 40 are used solely for the purpose of controlling the aircraft in flight about its three axes.

The tail planes 39 and 40 are thus each a combined engine pylon and tail plane, each supporting one of the engines 41 or 42 of the thrust producing power plants 43 or 44, intermediate of the length thereof. The tail planes 39 and 40 are identical in construction for reducing manufacturing cost and for efficient storage and replacement, each being fixed to the upper portion 45 of the tail of the fuselage and extending upwardly and laterally therefrom to a terminal tip 46, so that the entire tail plane, including the engines are at a level well above the level of the main wing 28 and fuselage 21.

The tail planes 39 and 40 include a supporting structure at the base thereof which constitutes an engine pylon for immovably supporting the power plants 43 and 44 to give forward thrust to the aircraft 20 and to provide a steady flow of air, or slip stream, over the control surfaces on the tail assembly. Location of the power plants on these tail planes enables the engines to be well back of the passenger cabin for reducing noise level in the cabin while also locating the engines as far aft as possible and away from the forward portion 24 and entrance door 23. Greater safety to passengers while embarking and disembarking is therefore achieved even though the engines are still running. The structure also permits the aircraft to taxi into an open doorway 47 of an aircraft terminal 48, with the forward portion 24 entirely under cover, in order to load and unload passengers out of the weather, and without stopping the engines. The aircraft 20 may then be backed out of the doorway 47 to go on its way. The power plants 43 and 44 are preferably of the turbo-propeller type wherein the gas turbine drives a propeller 50, with controllable pitch, or automatic controllable pitch, on the propellers enabling forward or reverse thrust. The propellers 50, rotating on an axis well above the longitudinal axis 22, are well above ground level and away from dirt and small stones, which erode propeller tips of conventional aircraft. The engines 41 and 42 may also be of the pure turbo-jet type with reverses on the tail pipe of the jets to provide reverse thrust.

In this invention, the main lifting wing 28 is free, throughout its length, of longitudinal control ailerons; and is not used for control of the aircraft around its longitudinal axis. Wing 28 is therefore free along its entire length of leading edge 29 or trailing edge 51, for lift control surfaces such as the flaps 52, or for split flaps, or flap and slot combinations which provide the lifting wing with means for varying the coefficient of lift to provide a maximum amount of variation in performance from slow speed flight to high speed flight.

All of the directional, or attitude control surfaces of aircraft 20 are mounted on the tail assembly 38. As shown, the tail planes 39 and 40 have movable control surfaces 53, 54, 55, and 56, which, when operated in proper coordination can provide the aircraft 20 with control in all three axes. Since the tail planes 39 and 40 are not in the same plane, but are each in separate inclined planes, they can be so used for controlling the attitude in any direction.

If all of the movable surfaces 53, 54, 55 and 56 are elevated upwardly, it tends to lower the tail of the aircraft and to make the aircraft go up. If all are deflected downwardly, the tail is lifted and the aircraft deflected downwardly. If surfaces 53 and 55 are deflected up and surfaces 54 and 56 are deflected down, the resulting movement around the longitudinal axis 22 will make the plane roll. If surfaces 53 and 54 are deflected down and surfaces 55 and 56 are deflected up, the tail of the aircraft is pushed sidewise and the aircraft will tend to rotate around its vertical axis 25.

The aircraft 20 is reduced in cost of manufacture by reason of the simplified main wing 28, which does not require longitudinal control structure, wheel wells, or engines mounting structure. It is thus free to have the best aero-dynamic characteristics for lift. Similarly, the left and right tail planes 39 and 40 are substantially identical, including the control surfaces and engine mountings, for ease of production.

What is claimed is:

1. In an aircraft the combination of
   an elongated fuselage free of engines and having a central, horizontal, longitudinal axis, a horizontal, lateral axis and a central, vertical axis:
   a main monoplane lifting wing immovably fixed centrally on said fuselage below said longitudinal axis, said main wing being free of engines and free of attitude, or directional, control surfaces throughout its area;
   a tail assembly comprising a pair of combined engine pylons and tail planes each fixed on an opposite side of the tail of said fuselage and extending upwardly and laterally therefrom in a separate inclined plane to mutually define a V configuration, said tail assembly being free of conventional horizontal stabilizers and vertical fin and rudder structure;
   a pair of forward thrust-producing power plants each immovably fixed intermediate of the height of one of said combined engine pylon and tail planes at a level well above the said longitudinal axis
   and attitude, or directional, control means including at least two movable control surfaces on the trailing edge of each said combined engine pylon and tail plane, said surfaces acting as elevator, rudder and roll control elements for controlling the attitude of said aircraft on all three said axes thereof.

2. An aircraft as specified in claim 1 wherein:
   each engine on each said combined engine pylon and tail plane includes a forward propeller creating a slip stream therebehind and the said control surfaces on said engine pylon and tail plane are located within said slip stream.

3. An aircraft as specified in claim 1 wherein:
   said main lifting wing is fixed under said fuselage, entirely in rear of the central lateral axis thereof and includes lift control means along the full length of the trailing edge of each opposite side of said wing for selectively changing camber and lift co-efficient.

4. An aircraft as specified in claim 1 wherein:
   said fuselage is generally cylindrical in configuration, said main lifting wing is immovably fixed tangentially therebelow;
   and landing gear pods are fixed to the undersurface of said wings independent thereof and exteriorly thereof,
   whereby said main wing is free of landing gear recesses and adapted to hold a maximum fuel supply.

5. In an aircraft the combination of
   an elongated fuselage having a central longitudinal axis
   a main monoplane lifting wing fixed centrally of said fuselage below said axis, said main wing being free of engines and directional control surfaces throughout its area;
   a tail assembly including a pair of combined engine pylons and tail planes, each fixed on an opposite side of the tail of said fuselage to mutually define a V configuration, said tail assembly being free of conventional vertical rudder and horizontal stabilizer structure;
   a pair of thrust-producing power plants, each fixed intermediate of the height of one of said combined engine pylons and tail planes at a level well above said axis,
   and attitude control means, including a plurality of movable control surfaces on the trailing edge of each said combined engine pylon and tail plane for controlling the attitude of said aircraft on all three axes thereof;
   each said combined engine pylon and tail plane, power plant and the movable control surfaces on said tail plane being identical,
   whereby manufacturing cost is reduced and replacement and storage of parts is more efficient.

6. In an aircraft of the type having a cantilever, low level monoplane wing, a pair of tail planes of V shaped configuration and a first combined elevator and rudder control surface on each said tail plane the combination of
   engine pylon structure in each said tail plane and a thrust-producing engine immovably supported by said structure intermediate of the height of said tail plane, the remainder of said aircraft being free of thrust-producing engines and said monoplane wing being free of directional control surfaces, and
   a second combined elevator and rudder control surface on each said tail plane, said first and second control surfaces providing attitude, or directional, control on all three axes of said aircraft to selectively act as roll, rudder or elevator control elements.

7. An aircraft as specified in claim 6
   wherein said thrust-producing engine is a turbo jet having a forward propeller producing a rearwardly directed column of air, and
   said first and second control surfaces on each said tail plane are located thereon within the slip stream of the propeller thereon.

References Cited

UNITED STATES PATENTS

| | | | |
|---|---|---|---|
| 2,541,704 | 2/1951 | Koppen | 244—40 |
| 2,969,935 | 1/1961 | Price | 244—7 |
| 3,131,891 | 5/1964 | Lallemant | 244—102 |
| 3,295,799 | 1/1967 | Stoppe | 244—135 |

OTHER REFERENCES

Jane's All the World's Aircraft, 1963–1964, pp. 169, 170, 241, published by McGraw-Hill Book Company, Inc. 1963.

MILTON BUCHLER, *Primary Examiner.*

T. W. BUCKMAN, *Assistant Examiner.*

U.S. Cl. X.R.

244—55, 87